2,549,400

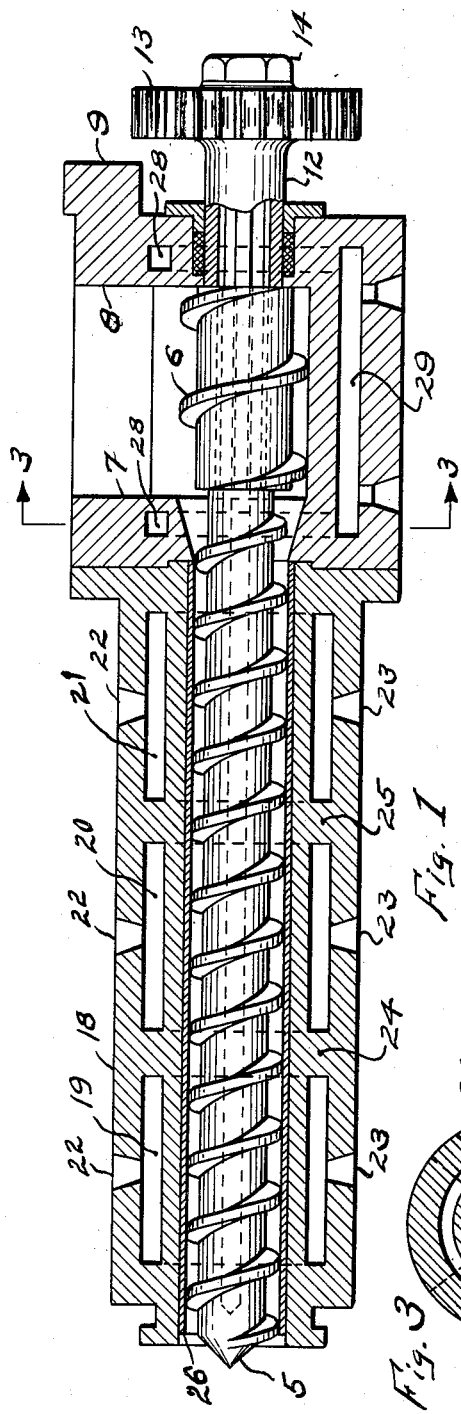
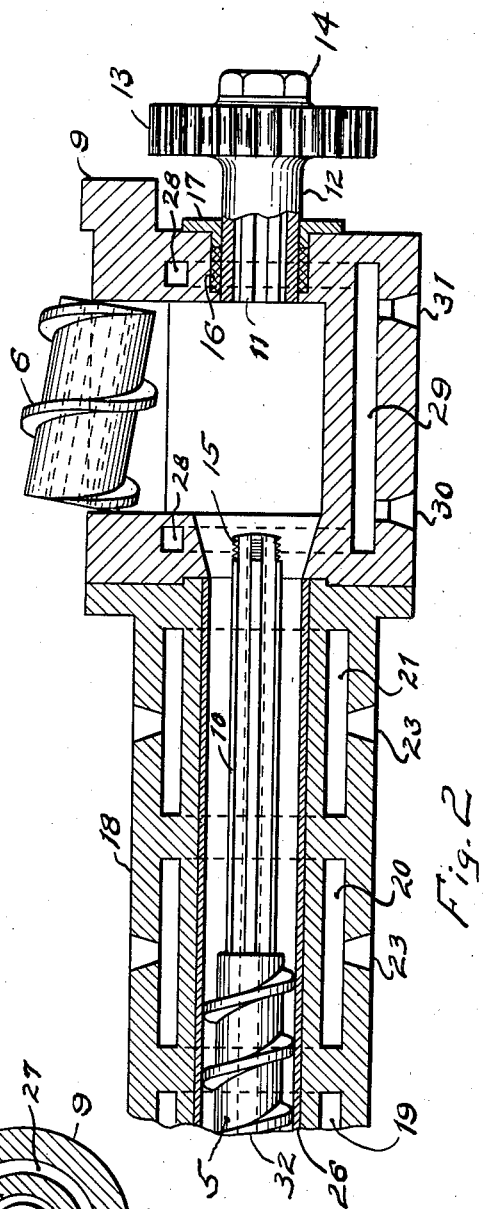
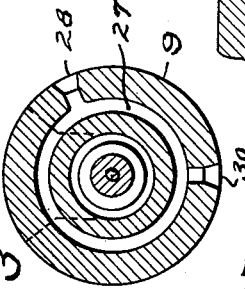
INVENTOR.
INGVAR EMIL TORNBERG
BY Martin J. Finnegan
ATTORNEY Patented Apr. 17, 1951

UNITED STATES PATENT OFFICE 2,549,400

EXTRUSION APPARATUS

Ingvar Emil Tornberg, Ridgewood, N. J.

Application October 3, 1949, Serial No. 119,229

3 Claims. (Cl. 18—12)

This invention relates to extrusion apparatus, and particularly to extrusion apparatus for the plastic molding of granular or powdered materials, by the application of heat thereto as said materials are conveyed along an extrusion channel.

In the prior art it has been customary to employ an elongated helically ribbed shaft, or screw, adapted to rotate in an extruder cylinder or corresponding elongation; the raw material being supplied to such extruder screw by way of a receiving chamber at one end of the cylinder in which the screw operates. An objection to this arrangement is its lack of ready adaptability to varying conditions as, for example, a change from one raw material to another raw material of different texture or hardness. Such a change normally requires substitution of an extruder screw of a different size, pitch or hardness, and the substitution of screws in turn is awkward and time-consuming, due to the extraordinary length of the screw, and the necessity of drawing it out of the machine from one end thereof, and frequently under conditions that render such endwise removal both cumbersome and dangerous.

An object of the present invention is to solve this problem by providing an extrusion apparatus including two screws in tandem relationship, one to the other; one screw being adapted to be inserted longitudinally of the machine, and to remain therein under varying conditions of operation, while the second screw is adapted for ready removal in a transverse, or side-wise, manner permitting quick substitution of a new screw of more appropriate properties for the handling of some different material, or other special task.

Another object of the invention is to provide novel means for inter-relating two tandem screws of the character indicated, so that one serves as the driving means for the other.

Another object is to provide, in an extrusion apparatus of the character described, novel means for supporting the extruder screw, said novel means including a compartmentalized construction, with each compartment serving as a separate chamber for circulating heating fluid, and the spaces between as bearing supports absorbing the stresses set up in operation.

Other objects and advantages of the invention will be apparent upon consideration of the following description of the form of the invention illustrated in the accompanying drawing wherein:

Fig. 1 is a longitudinal sectional view of an extrusion apparatus embodying the invention;

Fig. 2 is a similar view, but showing one screw shifted longitudinally and the other being withdrawn transversely; and Fig. 3 is a transverse sectional view along line 3—3, Fig. 2.

Referring mainly to Figures 1 and 2, the extruder screw is shown at 5, and the auxiliary feed screw at 6, the latter being insertible and removable transversely of the common axis of rotation of the two screws; the length of the auxiliary screw 6 being slightly less than the distance from wall to wall 7 to wall 8 of the feed hopper 9, so that said screw may readily be withdrawn, as indicated in Figure 2, whenever the main screw 5 is shifted longitudinally to the left, to the position indicated in Figure 2. It will be observed that the mouth of the hopper is of broader dimensions than in the prior art, to permit insertion and removal of the feed screw 6 therethrough. Hence it is an easy matter to change screw 6 for one of coarser or finer pitch, or different hardness or shape, to meet varying conditions encountered.

Screw 5 is shown as having an extension 10 (Fig. 2) of reduced diameter, and is externally splined for registry, first, with internal splines 11 of a driving sleeve 12, and secondly, with similar internal splines provided on screw 6. As a result, the rotation of sleeve 12 (as by connecting to the gear 13 a motor-driven gear or its equivalent) will cause corresponding rotation of both the screw 5 and the screw 6; the splined end 10 of screw 5 being the driving connection for both said screws. These splines on screw-end section 10 also facilitate longitudinal sliding of the screw 5 to the position shown in Figure 2, whenever the screw 6 is to be exchanged for another. A nut 14 is engageable with threads 15 formed on the end portion of the screw shank 10, to draw the screw 5 up tightly against the end of screw 6, to abut thereagainst as in Figure 1; the nut 14 being of course loosened whenever the screw 5 is to be drawn back as in Figure 2. A felt packing 16 is held in place by a gland nut 17, to insure fluid tightness about the joint between gear hub (sleeve) 12 and its bearing surface in hopper 9.

The novel means for supporting and housing the extruder screw 5 involves the division of the cylindrical housing 18 into a series of compartments 19, 20, and 21 as by providing longitudinally spaced coring in the semi-cylindrical molds in which the casting 18 is made. Each compartment is provided with diametrically opposed radial openings, as indicated at 22 and 23; the openings 22 serving for the admission of heating fluid, and the openings 23 for the discharge thereof. By using a series of individual heating circuits, each confined to a comparatively short section of the screw housing, the heating action is more uniform, and the heat flow more direct, than in prior systems where the heating fluid flows longitudinally along the entire length of the housing, in a single circuit. The compartmentalizing of the housing in this fashion also has the advantage of providing a plurality of radial bearing supports, as at 24 and 25, serving to protect the inner bearing section of the casting by absorbing radial stresses set up in the operation of the screw. To further protect the relatively porous casting 18 against injury by absorption of harmful chemical agents that may be present in the materials passing through the extruding channel, a steel liner 26 is interposed between the screw and the inner casting surface.

The hopper section 9 of the apparatus may also include a circuit for heating fluid, and as indicated this circuit may involve a pair of circular channels 27 (see Fig. 3) each having an inlet 28, and both merging in a common outlet passage 29, with discharge ports 30 and 31. The screws 5 and 6 may also be centrally bored, as indicated at 32 (Figure 2) to receive cooling fluid supplied thereto by way of a conduit (not shown) adapted to connect with said central passage 32, adjacent the nut 14.

While the invention has been described in detail with respect to one embodiment, other embodiments varying in form are possible without departing from the principles disclosed. All such are included herein.

What I claim is:

1. In apparatus for plastic molding of powdered or granular material by passage through an extrusion chamber, an extrusion screw rotatable in said chamber, means including a second screw for feeding the material to said extrusion screw, and common driving means for both said screws, said common driving means including a splined shank integral with said extrusion screw, a set of co-operating splines formed about the hollow interior of said feeding screw, said splined shank being of sufficient length to extend completely through said feeding screw and project therefrom, and a power-driven element operatively engaging the projecting portion of said shank.

2. Apparatus as defined in claim 1, including a material receiving hopper, said feeding screw being insertible into and removable from the apparatus by way of the mouth of said hopper, upon longitudinal displacement of said splined shank to clear the forward face of said feeding screw.

3. Apparatus as defined in claim 1, including a housing for said extrusion screw, said housing having a plurality of separate material heating circuits embodied therein, each of said circuits being spaced longitudinally of the others.

INGVAR EMIL TORNBERG.

REFERENCES CITED

The following references are of record in the file of this patent:

UNITED STATES PATENTS

| Number | Name | Date |
|---|---|---|
| 113,847 | Bryant | Apr. 18, 1871 |
| 1,156,096 | Price | Oct. 12, 1915 |
| 1,283,947 | Steinle | Nov. 5, 1918 |
| 1,935,050 | Gordon | Nov. 14, 1933 |